United States Patent

Ruesch

[15] 3,637,992

[45] Jan. 25, 1972

[54] METHOD AND APPARATUS FOR CHECKING THE PRESENCE OF A SET OF INFORMATION-BEARING CARDS

[72] Inventor: Ferdinand Ruesch, St. Gall, Switzerland

[73] Assignee: Gretag Aktiengesellschaft, Regensdorf, Switzerland

[22] Filed: July 2, 1970

[21] Appl. No.: 51,953

[30] Foreign Application Priority Data

July 8, 1969 Switzerland .........................10515/69

[52] U.S. Cl. .........................235/61.11 R, 209/80.5, 73/156

[51] Int. Cl. ..........................................................G06k 5/00

[58] Field of Search .............209/80.5, 110, 110.5; 340/280, 340/281; 73/156; 235/61.11 R, 61.11 A–61.11 E, 61.7; 250/219 ID; 178/17 D

[56] References Cited

UNITED STATES PATENTS

| | | | |
|---|---|---|---|
| 2,169,050 | 8/1939 | Johnston | 209/80.5 |
| 3,253,087 | 5/1966 | McIntosh | 178/17 |
| 3,480,763 | 11/1969 | Gantner, Jr. | 235/61.11 |

*Primary Examiner*—Thomas A. Robinson
*Attorney*—Pierce, Scheffler & Parker

[57] ABSTRACT

A method and apparatus is disclosed for checking the presence of all the cards of a set of punched cards required for a program of a data processing apparatus, the cards each bearing a different code word and the cards being stacked so that all the code words combine to produce a completion code word indicating that all the cards are present. The code words are each represented by holes and one blank space in the cards and each card has a hole in a predetermined position, the completion code word being provided when the hole positions are sensed and only that hole in the predetermined position passes completely through the stack, the other hole positions being obstructed by a blank in a card.

8 Claims, 4 Drawing Figures

Inventor

Ferdinand Ruesch

By Pierce, Scheffler & Parker

Attorneys

PATENTED JAN 25 1972 3,637,992

Inventor

Ferdinand Ruesch

By Pierce, Scheffler & Parker

Attorneys

METHOD AND APPARATUS FOR CHECKING THE PRESENCE OF A SET OF INFORMATION-BEARING CARDS

This invention relates to a method and apparatus for testing that all the data cards required for a program for data processing apparatus are present.

Methods and apparatus of such a kind are useful in processes in which a plurality of components or products are to be processed to provide one or several intermediate or end products. Assuming that these components are identified and accompanied by data carriers, such as punched tapes, magnetic tapes or punched cards, the presence, i.e., the presence of all the components required for performing the process can be verified by checking whether all the data carriers are present. Conventional methods of carrying out such checks consist in counting the data carriers, or checking them one by one in rotation. Known mechanical checking methods of this kind can be performed on punched cards for instance by punched card reading equipment and a computer. Manual and mechanical control proceeds by consecutive counting and checking the data carriers individually.

In accordance with this invention we provide a method of testing a set of cards forming a program for data processing apparatus to ensure that all the cards of the set are present comprising providing each card with a different code word, and stacking all the data cards in a specified manner so that all the code words on the cards combine to produce a particular code word only when all the data cards are present.

In a preferred mode of carrying the proposed method into effect the code is a hole code in which all the coding positions on each card except one contain holes, and all the data cards are collated in at least one stack so that corresponding positions of the code are in register, each position being checked whether or not a hole continues completely through the stack and the presence of all the data cards being confirmed only if a hole that passes completely through the stack is found in only one of the coding positions.

Apparatus for performing the above-mentioned preferred method comprises means for holding a stack of punched cards, and a plurality of spring-loaded pins opposite the coding positions on the cards, the pins entering the holes in the cards to control electrical contacts of a checking circuit which indicates the existence of a particular state represented by a particular code word only when each of the pins except one is prevented from passing completely through the stack by a card.

In a preferred embodiment of such apparatus the particular code word which indicates the presence of all the data cards may likewise be punched in a data card. Moreover, such apparatus can also be used as a peripheral unit associated with a computer.

The proposed method is particularly useful for monitoring, checking and controlling processes, such as mixing and packing. For mixing, a limited number of components are needed, each accompanied by a data card. In packing processes a particular product is to be filled into a particular container. Furthermore, certain pamphlets, labels and boxes may also be required. All these packing items and accessories, descriptions, labels and instructions should each be accompanied by a data card, such as a punched card. For mixing and packing processes the proposed method provides an extremely simple way of checking whether all the required components are present and correct.

An embodiment of the proposed method will be hereinafter described with reference to the drawings which illustrate apparatus according to the invention for performing the method and parts of such apparatus. In detail, in the drawings.

Figure 1:
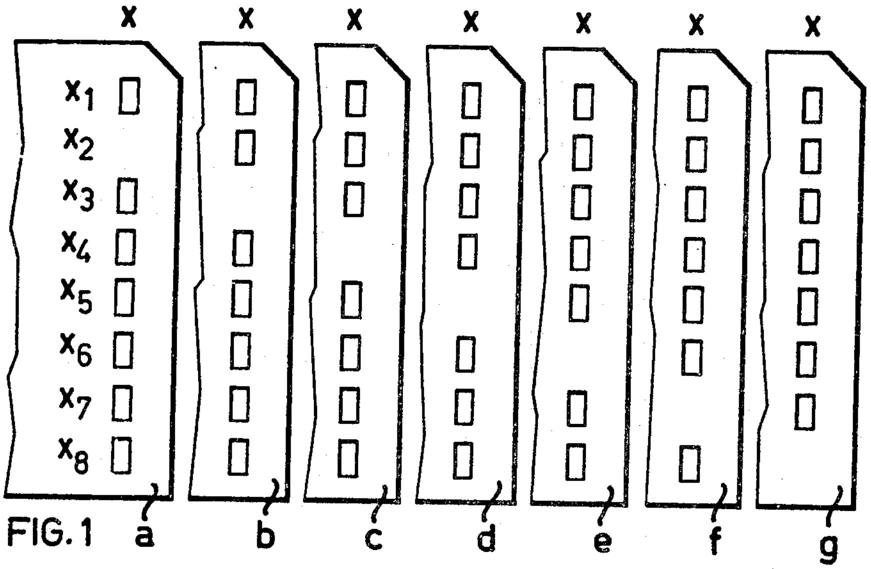
FIG. 1 shows portions of punched cards bearing different code words.

The punched cards which are fragmentarily shown in FIG. 1 are intended to be checked for completeness. In other words, it is desired to ascertain whether all the cards *a, b, c, d, e, f, g* are in fact present. For this purpose each card is coded in a column $x$ containing the coding positions $x_1$, $x_2$, $x_3$, $x_4$, $x_5$, $x_6$, $x_7$, $x_8$. Position $x_1$ contains a hole in every card. All the other positions $x_2$ to $x_8$ except one in each card likewise contain a hole. However, the position containing no hole in each of the punched cards *a* to *g* is in a different position. The check for completeness in this example is effected by placing the cards in a stack. If the set of cards is complete one hole, and only one hole, will extend through all the cards, namely $x_1$. If one or more of the cards are absent two or more holes will penetrate the entire stack. The above-described method permits the presence of $n$ cards to be checked for completeness by means of an $n+1$-position code.

Figure 2:
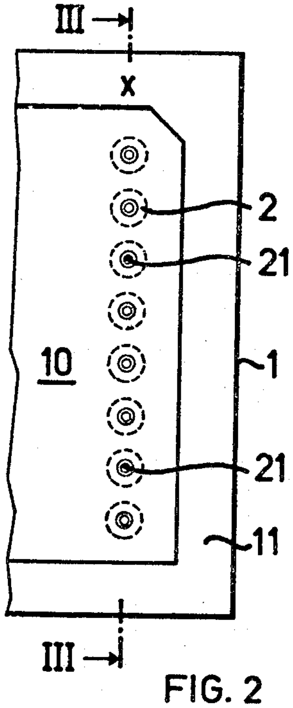
FIG. 2 is a plan view of part of a card reader.

The punched card reader 1 fragmentarily shown in FIG. 2 comprises a baseplate 11 containing a recess 10 of the same shape as a punched card. In the coding positions the pins 21 of contact switches may be arranged to project into the recess 10. Therefore, if a single or a stack of punched cards *a* to *g* is placed into the recess 10 of the reader, the contact switches will operate or not operate according to the presence or absence of coding holes. For example, when the pins 21 are pushed back into their sockets their contact faces 22 will lose contact with the cooperating contact face 23, as will be understood by reference to FIG. 3.

Figure 3:
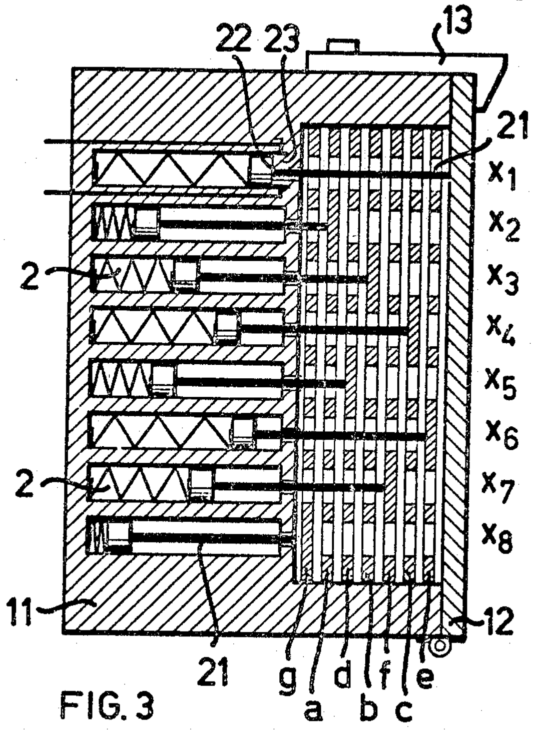
FIG. 3 is a sectional view taken on the line III—III of FIG. 2.

FIG. 3 is a sectional side view of the reader 1, the section being taken on the line III—III in FIG. 2. A stack of punched cards has been inserted into the recess 10 in the baseplate 11. The punched cards are held in position by a cover 12 kept in intimate contact with the sides of the recess 10 by a snap-action lock 13. In the code described with reference to FIG. 1 only the pin 21 of the contact switch 2 in position $x_1$ will not be forced back into its socket, irrespectively of the particular order in which the cards have been collated and stacked.

Figure 4:
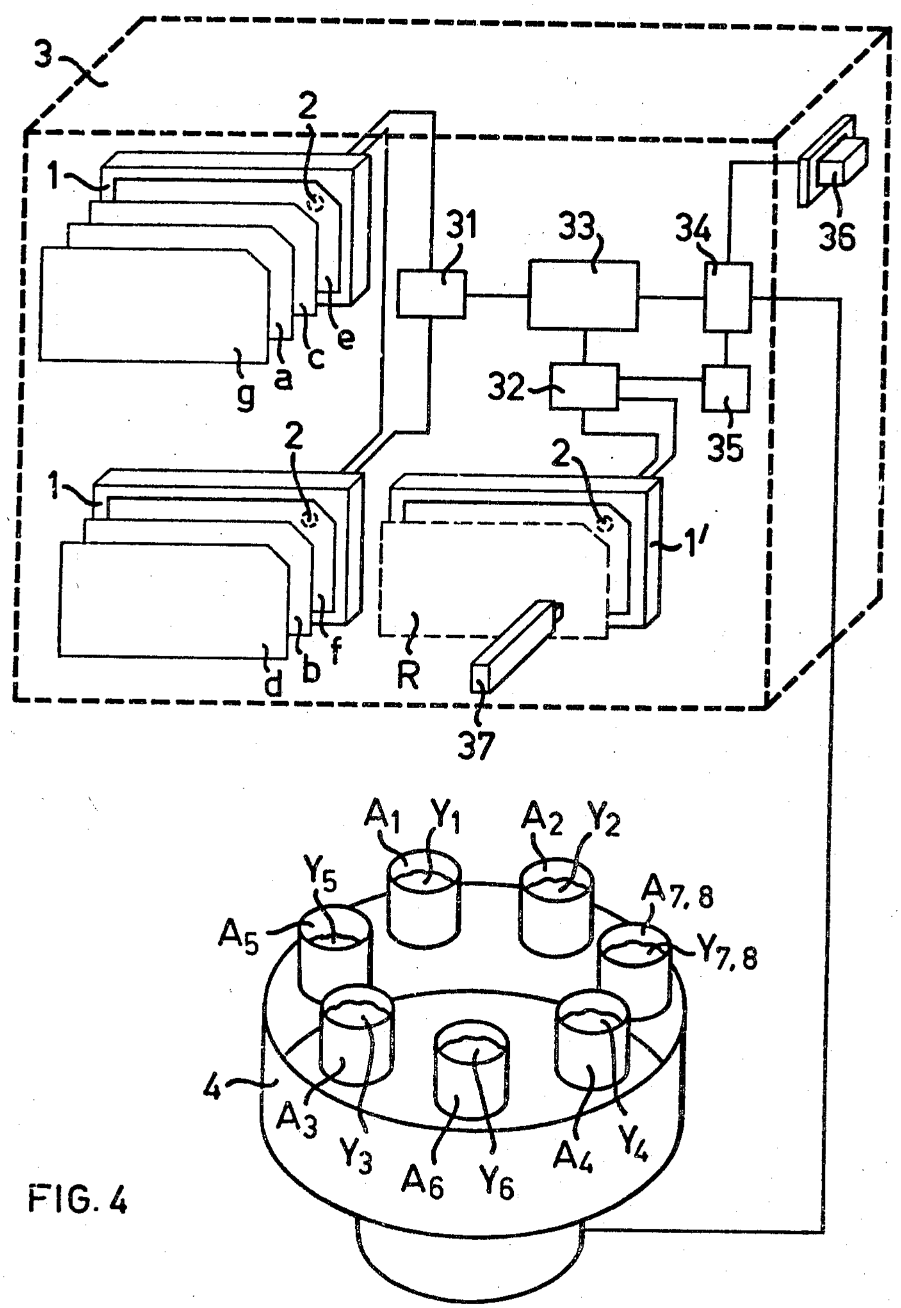
FIG. 4 shows apparatus operating according to the proposed method for controlling and monitoring a mixer.

In FIG. 4 the schematically illustrated monitoring and control unit for a mixing plant 4 contains two of the punched card readers described with reference to FIGS. 2 and 3. Their function is the same as that of a single reader designed to accommodate the complete set of cards. Identical functioning can be achieved for instance by the series connection of the contact switches 2 associated with corresponding coding positions in the two readers, irrespectively as to which particular cards happen to have been inserted into each of the readers. The contact switches 2 are connected in series to, say, an electronic reading unit 31.

Assuming eight substances $Y_1$, $Y_2$ to $Y_8$ are to be mixed in the mixer 4, let the prescribed quantity of each of the substances $Y_1$ to $Y_6$ be contained in a separate storage tank $A_1$–$A_6$, whereas the substances $Y_7$ and $Y_8$ are both contained in one tank $A_{7,8}$. In respect of each tank there is provided a data card, such as a punched card *a, b, c, d, e, f, g* containing details of the product, batch, quantity, weight, weighing tolerance and so forth. Moreover, let each of these data cards also bear the code word of a completion code which requires for instance the eight substances $Y_1$ to $Y_8$ to be present for the mixing process, as described. The seven data cards $Y_1$, $Y_2$, $Y_3$, $Y_4$, $Y_5$, $Y_6$ and $Y_{7,8}$ are therefore inserted into the readers 2 of a control unit 3. An order card or a recipe card R calls for the data cards *a, b, c, d, e, f,* and *g*, and their presence is checked with the aid of the prescribed completion code word. From a third reader 1' the required code word is set up and recorded in the reading unit 32 by means of the order, recipe or programming card R.

In a comparator 33 the values set up in the reading units are compared. If the values in the reading unit 31 are correct, i.e., in agreement with those in the reading unit 32 the control unit 34 is cleared. The reading unit 32 may be arranged to control a timing unit 35 which ensures that the time taken for a mixing process agrees with that prescribed on the programming card. It may be desirable, after the control unit 34 has been internally cleared by all the monitoring elements 31, 32, 33, 35, to clear the unit for external operation by the depression of a starting key 36. The mixing process can then proceed in the mixer 4. At the end of the process the programming card R which had been inserted in the reader 1' may serve in the next procedural step as a data card for the mixture product. This may be made dependent upon a corresponding confirmation device 37 providing the order card R constituting the fresh data card for the mixed product with a coded confirmation that the mixing process has been correctly performed. This may be done with the aid of one or more coding holes.

What is claimed is:

1. A method of testing a set of cards forming a program for data processing apparatus to ensure that all the cards of the set are present comprising providing each card with a different code word, stacking all the data cards to align all the code words on each card so that they combine to form a particular code word when all the cards of a set are present and sensing the aligned code words to detect said particular code word.

2. A method according to claim 1 wherein the number of cards in a set is N and the code words each comprise N+1 bits represented by N holes and a blank, one of the N holes in each card being in a predetermined position; and including sensing that the hole in said predetermined position passes completely through the stack and all the holes in the other coding positions are obstructed.

3. A method according to claim 2 including sensing all the coding positions simultaneously.

4. Apparatus for testing a set of cards forming a program for data processing apparatus to ensure that all the cards of the set are present comprising means for supporting a stack of cards each bearing a different code word, the code words combining to form a particular code word when all the cards of the set are present, means for sensing the combined code words and means responsive to said sensing means to indicate the presence of said particular code word.

5. Apparatus according to claim 4 wherein said stack comprises N cards and each code word comprises N+1 bits represented by N holes and a blank one of said N holes being in the same predetermined position and said particular code word comprises N+1 bits represented by N blanks and one hole, said sensing means including a plurality of pins for sensing the coding positions of a code word and said indicating means includes an electric circuit responsive to the positions of said pins to provide an output signal upon sensing said particular code word when only one pin passes completely through said stack at said predetermined position and the other pins are obstructed from passing through said stack by blanks in said cards.

6. Apparatus according to claim 5 wherein said pins are spring loaded and said electric circuit includes switches operated by said pins to provide said output signal.

7. Apparatus according to claim 1 wherein said supporting means comprises a block having a recess therein receiving said stack of cards, a cover plate over said recess to retain said stack therein and means for locking said cover to said block.

8. Apparatus according to claim 1 including first electrical circuit means for entering said particular code word, second circuit means for comparing said particular code word with the word sensed by said sensing means sensing the combined code words of the stack and third electrical circuit means for providing an output signal when the word sensed by said sensing means is the same as that entered by said first circuit means when compared by said second circuit means.

* * * * *